(12) United States Patent
Lee et al.

(10) Patent No.: US 7,776,142 B2
(45) Date of Patent: Aug. 17, 2010

(54) BUBBLE DAMPER OF SLURRY SUPPLY APPARATUS

(75) Inventors: Young-Hun Lee, Chungcheongnam-do (KR); Jae-Hyun You, Chungcheongnam-do (KR)

(73) Assignee: Semes Co., Ltd., Chungcheongnam-Do (KR)

( * ) Notice: Subject to any disclaimer, the term of this patent is extended or adjusted under 35 U.S.C. 154(b) by 287 days.

(21) Appl. No.: 11/899,366

(22) Filed: Sep. 5, 2007

(65) Prior Publication Data

US 2008/0060525 A1 Mar. 13, 2008

(30) Foreign Application Priority Data

Sep. 11, 2006 (KR) .................... 10-2006-0087552

(51) Int. Cl.
*B01D 19/00* (2006.01)

(52) U.S. Cl. .................... 96/157; 96/176; 96/180; 96/219; 95/259

(58) Field of Classification Search ............ 96/176, 96/180, 155, 219, 157; 95/254, 259
See application file for complete search history.

(56) References Cited

U.S. PATENT DOCUMENTS

| | | | | |
|---|---|---|---|---|
| 2,385,522 A * | 9/1945 | Malott | ........................ | 184/6.23 |
| 5,792,237 A * | 8/1998 | Hung et al. | ........................ | 95/24 |
| 6,171,367 B1 * | 1/2001 | Peng et al. | ........................ | 95/46 |
| 6,336,959 B1 * | 1/2002 | Kamo | ........................ | 95/241 |
| 6,702,655 B2 * | 3/2004 | Chen et al. | ........................ | 451/99 |
| 6,860,723 B2 * | 3/2005 | Chen et al. | ........................ | 417/43 |
| 2004/0199293 A1 * | 10/2004 | Pham et al. | ........................ | 700/265 |
| 2005/0175472 A1 * | 8/2005 | Udagawa | ........................ | 417/313 |
| 2009/0298393 A1 * | 12/2009 | Kozasa | ........................ | 451/41 |

FOREIGN PATENT DOCUMENTS

| | | |
|---|---|---|
| CN | 1487576 A | 4/2004 |
| JP | 2001-353660 | 12/2001 |
| KR | 1020000020258 A | 4/2000 |

OTHER PUBLICATIONS

Notice of Examination Report from the Korean Intellectual Property Office issued Aug. 13, 2007.
Office Action issued Apr. 24, 2009 during examination of the corresponding Chinese patent application No. 200710140182.2.
Office Action issued Jan. 12, 2010 during examination of the corresponding Japanese patent application No. 2007-171379.

* cited by examiner

*Primary Examiner*—Duane Smith
*Assistant Examiner*—Douglas J Theisen
(74) *Attorney, Agent, or Firm*—Myers Bigel Sibley & Sajovec, PA

(57) ABSTRACT

Provided is a bubble damper of a slurry supply apparatus, more particularly, a bubble damper of a slurry supply apparatus in which a bubble damper removes bubbles generated by a slurry supply apparatus. The bubble damper system includes a slurry drum in which slurry is stored, a vessel to which the slurry is supplied from the slurry drum, and a bubble damper that is provided between the slurry drum and the vessel. The bubble damper collects bubbles generated from the slurry that is supplied from the slurry drum.

11 Claims, 4 Drawing Sheets

BUBBLE DAMPER OF SLURRY SUPPLY APPARATUS

CROSS REFERENCE TO RELATED APPLICATION

This application claims priority from Korean Patent Application No. 10-2006-0087552 filed on Sep. 11, 2006 in the Korean Intellectual Property Office, the disclosure of which is incorporated herein by reference in its entirety.

BACKGROUND OF THE INVENTION

1. Field of the Invention

The present invention relates to a bubble damper of a slurry supply apparatus, and more particularly to a bubble damper of a slurry supply apparatus in which a bubble damper collects bubbles generated by a slurry supply apparatus.

2. Description of the Related Art

In general, a chemical mechanical planarization (CMP) process is a process in which an effect of a mechanical polishing using an abrasive is combined with an effect of a chemical reaction using an acid or basic solution so as to planarize the surface of a wafer.

An abrasive solution used in a CMP apparatus is called as slurry. Fine particles used for the mechanical polishing are uniformly dispersed in the slurry. The slurry is a solution in which an acid or basic solution reacting to a substrate to be abraded is dispersed and mixed in DI water. The slurry is disbursed between a pad and the substrate in the CMP process, and abrades mechanically and chemically the surface of the substrate.

The slurry can be classified into an oxide film CMP slurry and CMP slurry on the basis of the material thereof. Colloidal silica that contains fumed silica dispersed in DI water is commonly used as the oxide film CMP slurry. A solution that contains alumina ($Al_2O_3$) particles, ceria ($CeO_2$) particles, or copper (Cu) particle is used as the CMP slurry.

Accordingly, while the particles are mixed in the solution, bubbles may be generated due to characteristic of the solution. Further, while the slurry passes through pipelines, a pump, and valves used to supply slurry, bubbles may be generated due to the vortexes and friction occurring in the slurry.

When the bubbles are generated as described above, the slurry does not have an appropriate compounding ratio in a vessel used to mix the slurry. The reason for this is as follows: Since a sensor cannot accurately detect the amount of slurry containing bubbles, the slurry cannot have an appropriate compounding ratio.

For this reason, there is a demand for a system that suppresses the generation of bubbles in slurry or collects bubbles already generated.

SUMMARY OF THE INVENTION

Aspects of the present invention provide a bubble damper system that includes a bubble damper and efficiently collects bubbles by a vacuum pump or booster pump so as to stably supply slurry.

According to an exemplary embodiment of the present invention, there is provided a bubble damper system of a slurry supply apparatus, the system including a slurry drum in which slurry is stored, a vessel to which the slurry is supplied from the slurry drum, and a bubble damper provided between the slurry drum and the vessel. The bubble damper collects bubbles generated from the slurry that is supplied from the slurry drum.

BRIEF DESCRIPTION OF THE DRAWINGS

The above and other aspects and features of the present invention will become more apparent by describing in detail preferred embodiments thereof with reference to the attached drawings, in which.

DESCRIPTION OF THE EXEMPLARY EMBODIMENTS

Figure 1:
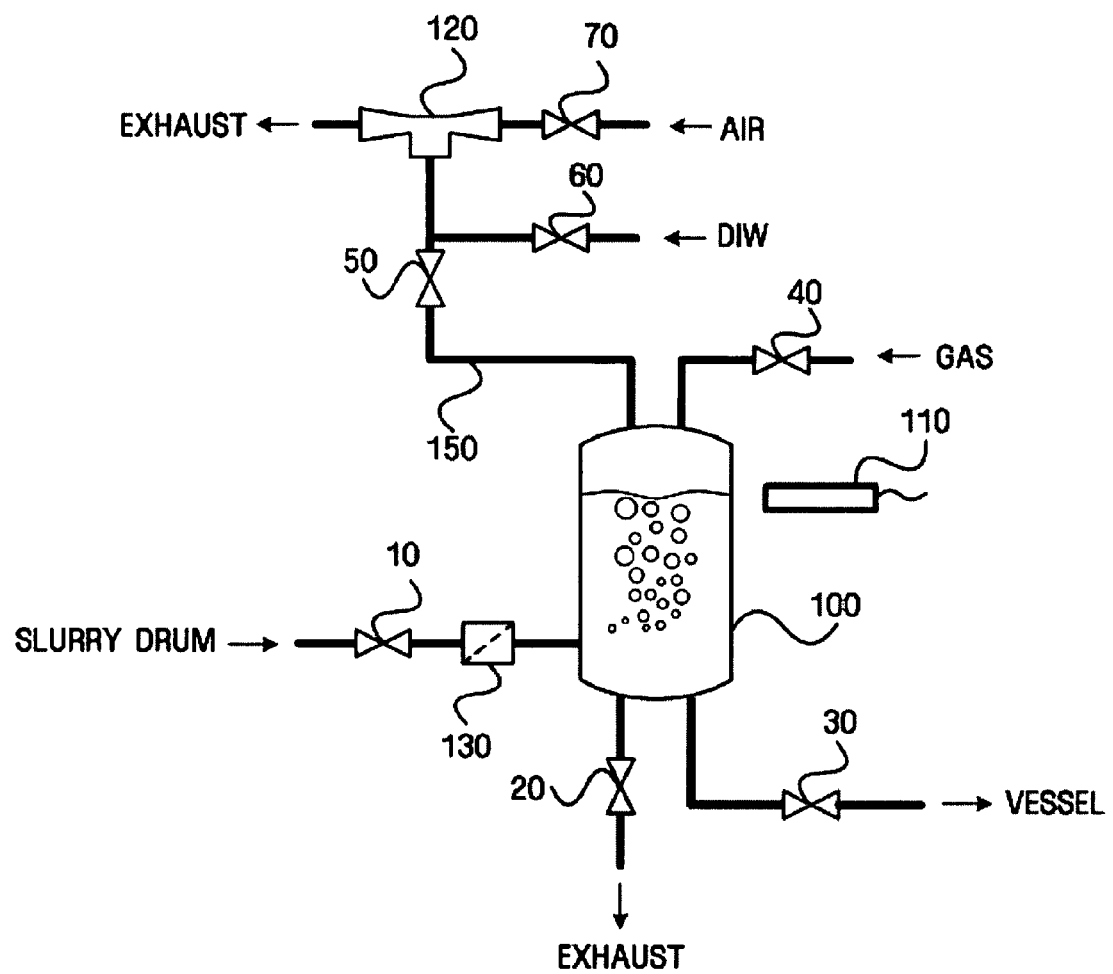
FIG. 1 is a view showing a slurry supply apparatus including a bubble damper according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, preferred embodiments of the present invention will be described in more detail with reference to the accompanying drawings.

FIG. 1 is a view showing a slurry supply apparatus including a bubble damper according to an embodiment of the present invention.

A slurry supply apparatus including a bubble damper according to the embodiment of the present invention includes a bubble damper 100, a damper sensor 110, a drum filter 130, an aspirator 120, a plurality of pipelines 150, and a plurality of valves.

The bubble damper 100 is used to temporarily store slurry supplied from the slurry drum. There are various methods of supplying slurry to the bubble damper 100. A first method of supplying slurry is as follow: As shown in FIG. 1, the aspirator 120 operates so that gas such as air passes through the aspirator. As a result, relatively low pressure is generated in the bubble damper. For this reason, since the pressure of the slurry drum becomes relatively high, the slurry is supplied from the slurry drum to the bubble damper due to pressure difference. A second method of supplying slurry is as follow: The aspirator is not used, and a booster pump is provided near the slurry drum. The slurry is supplied from the slurry drum to the bubble damper by the booster pump that is provided between the slurry drum and the bubble damper. A third method of supplying slurry is as follow: Relatively low pressure is generated by a vacuum pump provided near a vessel, so that the slurry is supplied from the slurry drum to the bubble damper and from the bubble damper to the vessel due to pressure difference.

The damper sensor 110 is used to detect the amount of slurry existing in the bubble damper 100. When the slurry exists in the bubble damper 100 and corresponds to the installation height of the sensor, the damper sensor 110 is turned on. When the slurry does not exist in the bubble damper 100 or does not correspond to the installation height of the sensor, the damper sensor 110 is turned off. The sensor may be an infrared sensor, which includes a light emitting part and a light receiving part, or an ultrasonic sensor, and can detect whether the slurry exists in the bubble damper. However, if a plurality of bubbles is generated in the slurry, the damper sensor may be repeatedly turned on and off even though the slurry exists in the bubble damper.

The drum filter 130 is used to filter off foreign substances from the slurry that is supplied from the slurry drum. Since the drum filter filters off the foreign substances in consideration of the size of fine particles contained in the slurry, foreign substances larger than abrasive particles used in the slurry is filtered off. As a result, it is possible to provide slurry that contains fine particles with uniform size.

The aspirator 120 is used to generate relatively low pressure in the bubble damper 100. The aspirator 120 includes a pipeline through which gas such as air passes. Since the pipeline has the smallest diameter at the middle of the aspirator 120, the gas passing through the pipeline has the highest speed at the middle of the aspirator. Accordingly, the aspirator 120 can lower the pressure by using Bernoulli's theorem in which speed is in inverse proportion to pressure. For this reason, the pressure in the bubble damper can be lower than the pressure at a position near the slurry drum. The aspirator may include a vane driven by a driving unit, such as a motor or engine, to aspirate and exhaust gas, such as air. Since the aspirator 120 operates as described above, slurry can be supplied from the slurry drum to the bubble damper when the slurry is consumed or insufficient in the bubble damper.

The pipelines 150 provide passages through which slurry, DI water, air, and the like passes. A plurality of pipelines is provided to supply desired materials to desired positions or vessels, and the pipelines may be connected with each other through vessels or valves. The diameter and material of each pipeline may be determined in consideration of the amount of fluid that is supplied per unit time, and pressure that is applied to each pipeline by a pump or the like. In addition, coated pipelines may be used to prevent the pipelines from being oxidized or corroded due to chemical additives or oxidizing agents that are contained in the slurry.

The valves 10, 20, 30, 40, 50, 60, and 70 are used to open and close the pipelines. For example, when the bubble damper provided with a plurality of valves aspirates air through the aspirator 120, the valve 70 should be opened. The valve 20 should be opened to discharge the slurry from the bubble damper 100.) Further, the valve 30 should be opened to supply slurry to the vessel. As described above, when the slurry needs to be supplied or discharged, the valves connected to the pipelines may be opened so that desired materials are supplied or discharged.

Figure 2:
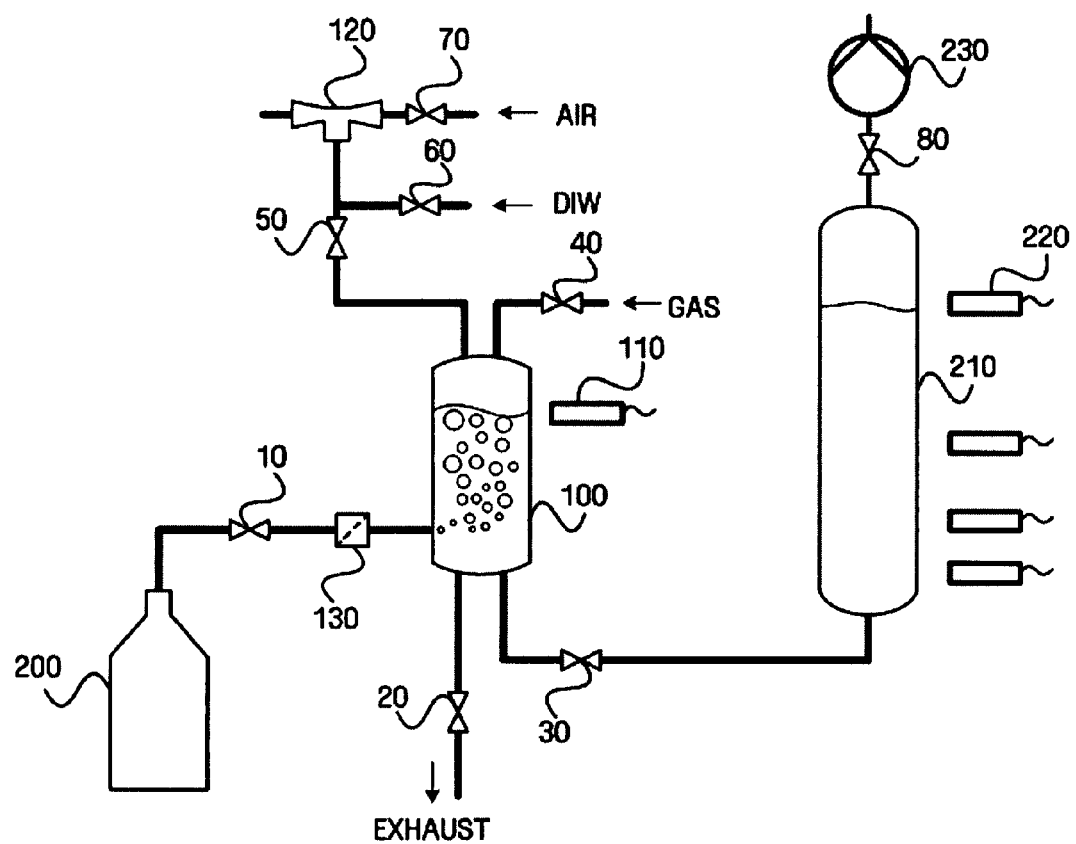
FIG. 2 is a view showing a bubble damper system of a slurry supply apparatus according to a first embodiment of the present invention.

FIG. 2 is a view showing a bubble damper system of a slurry supply apparatus according to a first embodiment of the present invention.

A bubble damper system of a slurry supply apparatus, which removes bubbles by a vacuum pump, according to a first embodiment of the present invention includes a bubble damper 100, a damper sensor 110, a drum filter 130, an aspirator 120, a plurality of pipelines 150, a plurality of valves 10, 20, 30, 40, 50, 60, 70, and 80, a slurry drum 200, a vessel 210, vessel sensors 220, and a vacuum pump 230.

The bubble damper 100, the damper sensor 110, the drum filter 130, the aspirator 120, the plurality of pipelines 150, and the plurality of valves 10, 20, 30, 40, 50, 60, 70, and 80 have been described in detail above. Accordingly, the descriptions thereof will be omitted, and other components except for them will be described below.

The slurry drum 200 is a vessel used to supply slurry. The slurry means abrasive solution that includes fine particles and solvent. Accordingly, while the fine particles are mixed to the solvent, bubbles may be generated. When the slurry supplied from the slurry drum is used up, the slurry drum may be replaced or slurry may be supplied to the slurry drum.

The vessel 210 is used to store the slurry supplied from the bubble damper 100. Since the vessel 210 is used as a vessel for supplying slurry required in a process, it is preferable that bubbles exist in the slurry stored in the vessel as few as possible. The vessel 210 supplies the slurry stored therein to a buffer vessel (not shown), which is used as a buffer, through the pipelines so that the buffer vessel supplies the slurry required in a CMP process.

The vessel sensors 220 are used to detect the amount of slurry that is stored in the vessel 210. The vessel sensors are provided so as to correspond to different installation heights. Accordingly, when whether each of the vessel sensors is turned on or off is detected, it is possible to detect the amount of the slurry. When the slurry is substantially used up, the vessel sensor corresponding to a low height is turned off. Therefore, slurry may be supplied to the vessel by using the bubble damper. Each of the sensors 220 may be an infrared sensor, which includes a light emitting part and a light receiving part, or an ultrasonic sensor, and can detect whether slurry exists in the bubble damper.

The vacuum pump 230 is used to supply slurry to the vessel 210. Since the vacuum pump 230 forms a vacuum, the vacuum pump 230 lowers the pressure of the vessel 210. For this reason, the pressure of the bubble damper 100 is higher than that of the vessel 210 connected to the bubble damper. As a result, slurry is supplied from the bubble damper 100 to the vessel 210. In addition, slurry stored in the slurry drum 200 is supplied to the bubble damper 100 through the pipelines due to pressure difference.

The operation of the bubble damper system of the slurry supply apparatus, which is configured as described above, according to the first embodiment of the present invention will be described below.

Slurry is supplied from the slurry drum 200 to the bubble damper 100 through the drum filter 130. The bubble damper 100 is filled with slurry, and the vacuum pump 230 operates to supply the slurry to the vessel 210. Pressure difference between the bubble damper 100 and the vessel 210 is generated by the vacuum pump 230, and the slurry stored in the bubble damper 100 is supplied to the vessel 210.

If the bubble damper 100 is not provided, the slurry drum 200 is directly connected to the vessel 210. Accordingly, bubbles may be generated in the slurry drum due to characteristic of fluid. Further, since air enters the pipelines during the replacement of the filter, bubbles may be generated in the pipelines. In addition, when the vacuum pump aspirates air to form a vacuum, the flow of slurry passing through the pipelines is tangled and vortexes are generated, thereby generating bubbles. Since constant pressure is not applied to the pipelines due to the generation of the bubbles, the supply of slurry may be destabilized. For this reason, a plurality of bubbles exists in the slurry stored in the vessel. Accordingly, the vessel sensors malfunction due to the bubbles, and the slurry does not have an appropriate compounding ratio in a process for stirring the slurry for the uniformization thereof.

For this reason, the bubble damper 100 is provided between the slurry drum 200 and the vessel 210. As a result, bubbles generated when the slurry is supplied from the slurry drum and passes through the drum filter are collected at the upper portion of the bubble damper, and the bubbles are decreased at the lower portion of the bubble damper. In this case, when the lower portion of the bubble damper is connected to the vessel by a pipeline, it is possible to supply the slurry to the vessel. For this reason, when the bubble damper is provided to the slurry supply apparatus, the bubbles in the slurry supplied to the vessel can be decreased even though the bubbles are not removed. As a result, it is possible to use uniform slurry in the following processes.

If the damper sensor 110 is turned off and slurry is decreased in the bubble damper 100 while slurry is supplied to the vessel 210, the vacuum pump 230 is stopped and the bubble damper 100 operates. The valve 30 is closed, and the aspirator 120 operates to feed slurry to the bubble damper 100. Since low pressure is generated by the aspirator 120, it is possible to supply slurry from the slurry drum 200 to the bubble damper 100. While slurry is supplied as described above, the bubbles collected at the upper portion of the bubble damper can be discharged to the outside through a discharge port.

The bubble damper is filled with slurry due to the operation of the aspirator, and the damper sensor is then turned on. Further, the bubble damper is filled with slurry, and the vacuum pump then operates again so that slurry is supplied to the vessel.

When the bubble damper is contaminated due to the repetitive operation of the aspirator, the bubble damper may be cleaned. First, the valves 20 and 40 are opened and gas is injected into the bubble damper so as to discharge the slurry remaining in the bubble damper 100. Alternatively, if the valves 50 and 60 are opened and DI water is supplied to the bubble damper, it is possible to discharge the slurry remaining in the bubble damper and to clean the bubble damper. When the pipelines under the vacuum condition come in contact with air from the outside, the slurry in the pipelines is hardened and clogs the pipelines or the pipelines may be contaminated. For this reason, the valve 60 is opened, and the pipelines may be cleaned for a predetermined time by DI water.

Figure 3:
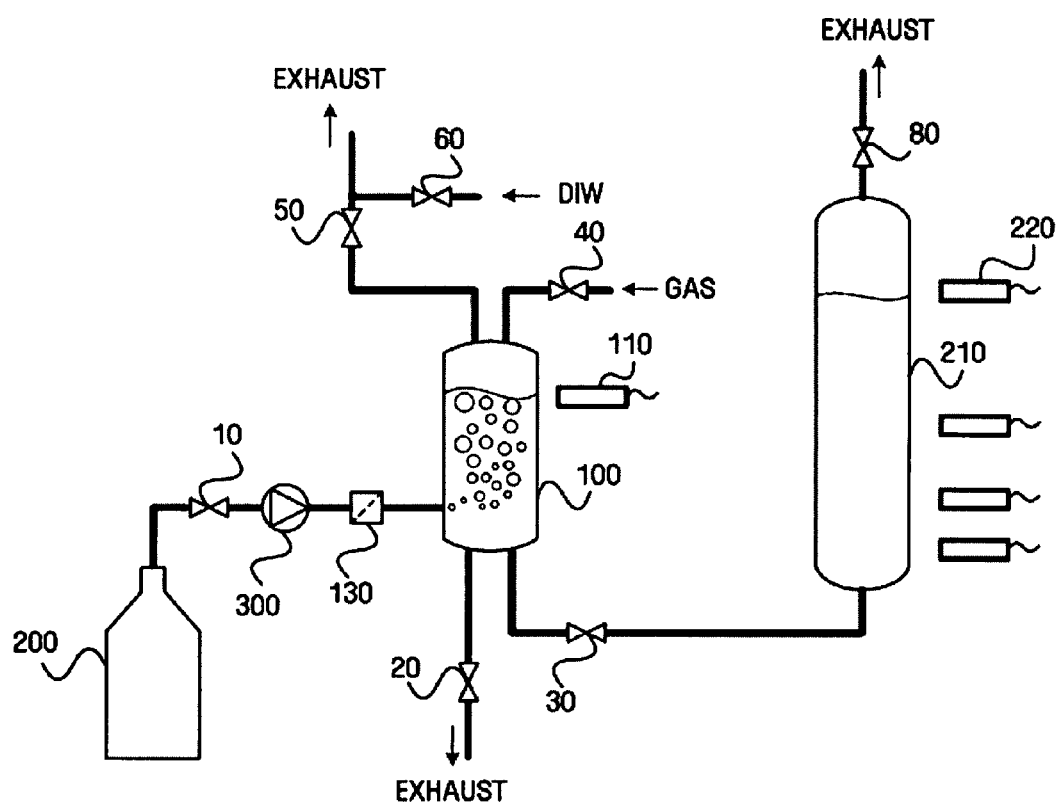
FIG. 3 is a view showing a bubble damper system of a slurry supply apparatus according to a second embodiment of the present invention.

FIG. 3 is a view showing a bubble damper system of a slurry supply apparatus according to a second embodiment of the present invention.

A bubble damper system of a slurry supply apparatus according to a second embodiment of the present invention includes a bubble damper 100, a damper sensor 110, a drum filter 130, a plurality of pipelines, a plurality of valves, a slurry drum 200, a vessel 210, vessel sensors 220, and a booster pump 300.

The bubble damper 100, the damper sensor 110, the drum filter 130, the aspirator 120, the plurality of pipelines, and the plurality of valves, the slurry drum 200, the vessel 210, and the vessel sensors 220 have been described in detail above. Accordingly, the descriptions thereof will be omitted, and other components except for them will be described below.

The booster pump 300 is used to increase pressure up to a predetermined value, and is used to supply slurry to the bubble damper 100 or the vessel 210 by using pressure. The booster pump 300 is positioned at the slurry drum 200, and generates high pressure at a position of the slurry drum. Accordingly, when a valve 80 provided to the vessel 210 is opened to lower the pressure of the vessel, the slurry can be supplied to the vessel through the pipelines due to pressure difference.

The operation of the bubble damper system of the slurry supply apparatus, which is shown in FIG. 3, according to the second embodiment of the present invention will be described below.

Slurry can be supplied from the slurry drum to the bubble damper 100 and the vessel 210 by the booster pump 300. In this case, the valve 80 provided to the vessel 210 is opened so that the slurry is supplied to the vessel due to the pressure difference between the booster pump and the vessel. If the damper sensor is turned off while the slurry is supplied to the vessel, the booster pump 300 is stopped and the bubble damper 100 operates.

The bubble damper may operate as follows: The valve 30 is closed, the valve 50 is opened, and the booster pump 300 operates. The slurry is supplied from the slurry drum to the bubble damper 100 by the booster pump 300. Accordingly, the bubble damper is filled with slurry, and the bubbles collected at the upper portion of the bubble damper can be discharged to the outside through the valve 50 and a discharge port.

After the bubble damper is filled with slurry, the valve 50 is closed and the valves 30 and 80 are opened. Then, the slurry can be supplied to the vessel 210 by the booster pump 300.

Figure 4:
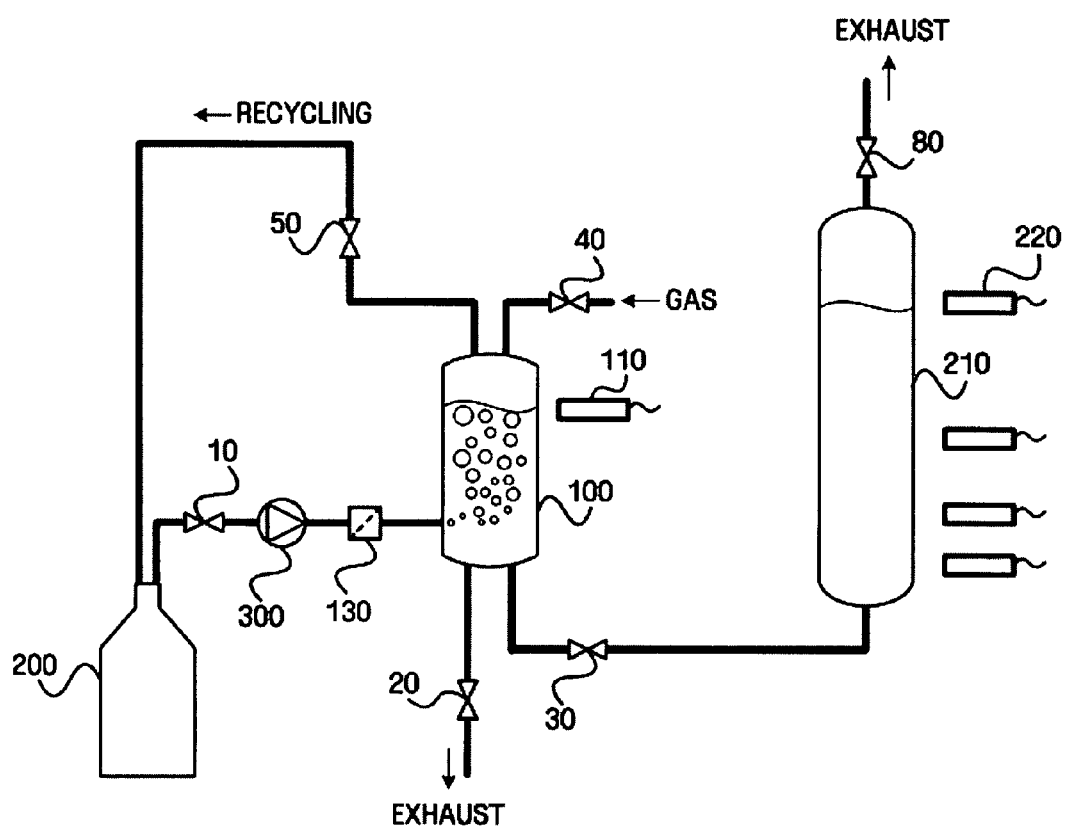
FIG. 4 is a view showing a bubble damper system of a slurry supply apparatus according to a third embodiment of the present invention.

FIG. 4 is a view showing a bubble damper system of a slurry supply apparatus according to a third embodiment of the present invention.

A bubble damper system of a slurry supply apparatus according to a third embodiment of the present invention includes a bubble damper 100, a damper sensor 110, a drum filter 130, a plurality of pipelines, a plurality of valves, a slurry drum 200, a vessel 210, vessel sensors 220, and a booster pump 300.

Since each of the components has been described in detail above, the descriptions thereof will be omitted. The operation of the bubble damper system of the slurry supply, apparatus according to the third embodiment of the present invention will be described below with reference to FIG. 4.

Like the bubble damper system of the slurry supply apparatus shown in FIG. 3, slurry can be supplied from the slurry drum 200 to the bubble damper 100 and the vessel 210 by the booster pump 300. In this case, the valve 80 provided to the vessel 210 is opened so that the slurry is supplied to the vessel due to the pressure difference between the booster pump 300 and the vessel. If the damper sensor is turned off while the slurry is supplied to the vessel, the booster pump 300 is stopped and the bubble damper 100 operates.

While the valve 30 is closed and the valve 50 is opened, the booster pump operates. Accordingly, the bubble damper is filled with slurry, and the bubbles collected at the upper portion of the bubble damper again enter slurry through a pipeline provided between the bubble damper and the slurry drum. As a result, the bubbles are added in the slurry drum, so that slurry contained in the bubbles is recycled. The bubble damper is sealed by the pipelines. For this reason, even though existing in the bubble damper, bubbles are not supplied to the vessel. As a result, bubbles are decreased in the slurry remaining in the vessel. In addition, since the bubbles recycled in the slurry drum can be broken in the slurry drum, the bubble damper system can function to break the bubbles.

Although the present invention has been described in connection with the exemplary embodiments of the present invention, it will be apparent to those skilled in the art that various modifications and changes may be made thereto without departing from the scope and spirit of the invention.

Therefore, it should be understood that the above embodiments are not limitative, but illustrative in all aspects.

According to the present invention, since a bubble damper is used in a slurry supply apparatus, it is possible to decrease bubbles in slurry supplied to a vessel.

In addition, it is possible to supply slurry to a vessel by a vacuum pump, and to discharge bubbles from a bubble damper by an aspirator.

Further, it is possible to supply slurry to a vessel by a booster pump, to collect bubbles by a bubble damper, and to discharge bubbles through a discharge port. As a result, it is possible to decrease bubbles in slurry supplied to the vessel.

Furthermore, since bubbles collected by a bubble damper are recycled using a pipeline connected to a slurry drum, it is possible to prevent slurry from being wasted.

Effects of the present invention are not limited to those mentioned above, and other effects of the present invention will be apparently understood by those skilled in the art through the following claims.

What is claimed is:

1. A bubble damper system of a slurry supply apparatus comprising:
    a slurry drum in which slurry is stored;
    a vessel to which the slurry is supplied from the slurry drum; and
    a bubble damper provided between the slurry drum and the vessel, the bubble damper collecting bubbles that are generated from the slurry supplied from the slurry drum;
    wherein the bubble damper includes a container having a lower portion to fill with the slurry and an upper portion to collect the bubbles from the slurry; and
    wherein the bubble damper includes a discharge port to discharge bubbles from the upper portion.

2. The bubble damper system of claim 1, further comprising:
    a vacuum pump connected to the vessel, the vacuum pump lowering the pressure of the vessel so that the slurry is supplied from the bubble damper to the vessel.

3. The bubble damper system of claim 1, wherein the bubble damper comprises a damper sensor detecting the amount of slurry in the bubble damper.

4. The bubble damper system of claim 1, further comprising:
    an aspirator connected to the bubble damper, the aspirator generating relatively low pressure in the bubble damper so that the slurry is supplied from the slurry drum to the bubble damper.

5. The bubble damper system of claim 1, wherein the vessel comprises vessel sensors detecting the amount of slurry in the vessel.

6. The bubble damper system of claim 1, further comprising:
    a drum filter provided between the slurry drum and the bubble damper, the drum filter filtering off foreign substances from the slurry that is supplied from the slurry drum.

7. The bubble damper system of claim 1, further comprising:
    a booster pump provided between the slurry drum and the bubble damper, the booster pump generating predetermined pressure so that the slurry stored in the slurry drum is supplied to the vessel through the bubble damper.

8. The bubble damper system of claim 7, wherein the bubble damper includes a damper sensor to detect the amount of slurry in the bubble damper and the bubble damper system is operative, using the booster pump, to supply slurry to the bubble damper and not to the vessel in response to the damper sensor detecting a low slurry level in the bubble damper.

9. The bubble damper system of claim 7, wherein a pipeline is provided between the bubble damper and the slurry drum, and the slurry remaining in the bubble damper is supplied to the slurry drum so as to be recycled.

10. The bubble damper system of claim 1 including an apparatus connected to the discharge port to generate a low pressure to remove bubbles from the upper portion through the discharge port.

11. The bubble damper system of claim 10 wherein the apparatus includes an aspirator.

* * * * *